United States Patent [19]
Kaplan

[11] 3,915,777
[45] Oct. 28, 1975

[54] METHOD OF APPLYING FIRE-RETARDANT COATING MATERIALS TO A SUBSTRATE HAVING CORNERS OR OTHER SHARP EDGES

[75] Inventor: Benjamin B. Kaplan, West Hartford, Conn.

[73] Assignee: Albi Manufacturing Co., Incorporated, Rockville, Conn.

[22] Filed: June 8, 1973

[21] Appl. No.: 368,140

Related U.S. Application Data

[60] Division of Ser. No. 165,375, July 22, 1971, which is a continuation of Ser. No. 780,262, Nov. 29, 1968, abandoned.

[52] U.S. Cl. .................... 156/202; 52/515; 52/727; 106/15; 106/16; 428/81; 428/121; 428/921; 427/413
[51] Int. Cl.² ... B32B 3/04; C09D 5/18; C09K 3/28; E04B 1/94
[58] Field of Search ....... 161/44, 93, 151, 149, 156, 161/170, 403, DIG. 4, 99; 106/16, 15 FP; 156/71, 202; 117/137; 52/515, 725, 727, 728

[56] References Cited
UNITED STATES PATENTS

| | | | |
|---|---|---|---|
| 1,919,677 | 7/1933 | Young | 106/15 FP X |
| 2,718,479 | 9/1955 | Bierly | 117/137 X |
| 2,824,664 | 2/1958 | French et al. | 161/149 X |
| 2,861,525 | 11/1958 | Curtis et al. | 52/515 X |
| 3,179,531 | 4/1965 | Koubek | 117/137 X |
| 3,202,567 | 8/1965 | Muri et al. | 161/403 X |
| 3,284,216 | 11/1966 | Kaplan | 106/16 |
| 3,493,460 | 2/1970 | Windecker | 161/DIG. 4 |
| 3,769,146 | 10/1973 | Ravel | 161/93 X |

*Primary Examiner*—Philip Dier
*Attorney, Agent, or Firm*—Patricia J. Hogan

[57] ABSTRACT

Protecting a surface from fire and excessive heat by coating it with (1) a protective composition comprising an intumescent paint and glass fibers and (2) a protective layer comprising a flexible, surface-conformable fabric sheet (e.g., a textile fabric) having sufficient strength and permeability to unite with a paint applied therewith, and, optionally, an overcoating of intumescent paint.

6 Claims, No Drawings

METHOD OF APPLYING FIRE-RETARDANT COATING MATERIALS TO A SUBSTRATE HAVING CORNERS OR OTHER SHARP EDGES

This is a division, of application Ser. No. 165,375, filed July 22, 1971, which is a continuation of application Ser. No. 780,262, filed Nov. 29, 1968, now abandoned.

This invention relates to protecting surfaces, such as steel, wood, plastic, etc., from excessive heat and fire, and, particularly, to improving the fire-retardant and heat-resistant properties of protective coatings including an intumescent paint.

It has previously been found that intumescent paints provide particularly effective fire-retardant and heat-resistant surface coatings. These intumescent paints usually contain a film-forming material, a carbonaceous material and a spumific agent and, upon exposure to elevated temperatures, puff up to protect the coated substrate. Improved fire-retardant and heat-resistant protective compositions have been prepared by combining a mass of glass fibers into an intumescent paint; advantageously, these fibers are precoated with a vinyl resin such as polyvinyl chloride. Even such compositions, however, will eventually break down after long exposure to elevated temperatures, particularly at corners, sharp edges, and other irregularly surfaced areas.

An object of the present invention is to provide an improved fire-retardant and heat-resistant protective coating.

Another object is to improve the effectiveness and durability of protective compositions including glass fibers and an intumescent paint, and particularly to reduce the tendency of such compositions to peel or crack at sharp edges.

Another object is to provide an improved method of applying such protective compositions to various surfaces, including steel, wood, and hardened plastics, which will increase the heat and fire-retardancy of these compositions over that achieved with conventional coating procedures.

The invention features a fire-retardant and heat-resistant coating applied by first coating the surface to be protected with a protective composition comprising (1) an intumescent paint consisting essentially of a volatile liquid vehicle, 35 to 150 parts by weight of a resinous film-forming binder, and 120 to 475 parts by weight of a solid spumific agent which when heated to 400°C causes a dried film of the paint to increase in thickness at least 4 times, and (2) 2 to 30% by weight (exclusive of the weight of any organic coating on the fibers), based on the remaining ingredients of the paint, of glass fibers; and overlaying this protective composition with a protective layer comprising a flexible, surface-conformable fabric sheet, e.g., a textile fabric, having sufficient strength and permeability to unite with a paint applied therewith. The coating may be dried either before or after applying the protective layer. In preferred embodiments, this protective layer may consist of an incombustible fabric, such as fiber glass cloth; a combustible fabric coated with an overcoating of intumescent paint; or an incombustible fabric coated with an overcoating of intumescent paint. The overcoating intumescent paint may, but need not also be combined with glass fibers. Also, 10% or more of the fibers in the protective composition may be glass fibers precoated with polyvinyl chloride.

Any of the known intumescent paints are suitable for use in the present invention. Among such paints are those described in U.S. Pat. Nos. 2,452,054; 2,452,055; 2,523,626; 2,628,946; 2,702,283; 2,917,476; 2,956,037; 2,984,640; 3,037,951, and 3,284,216. In general, such intumescent paints include a volatile liquid vehicle or carrier in which the remaining ingredients are dissolved or dispersed and which evaporates as the paint dries, a film-forming material or binder, preferably a synthetic resinous binder, which serves to bond the remaining ingredients to each other and to the surface of the substrate when the paint is dry, and one or more spumific agents which react, upon heating to an elevated temperature of the order of 125° to 400°C or even higher, with each other or with the binder or with some product evolved by heat-decomposition from the binder to cause the mass of the dried paint layer to puff or swell up into a foam-like mass at least four times as thick as the original dried paint layer. The binder may be present as a performed material or in the form of two or more separate ingredients which react with each other to form a resinous binder as the paint dries, such as a mixture of urea or thiourea or dicyandiamide or melamine with an aliphatic aldehyde (or source of aldehyde) such as formaldehyde or paraformaldehyde or trioxymethylene (or hexamethylene tetramine) or acetaldehyde or furfural. Other binders which may be used either alone or in combination with the foregoing include drying oils; alkyd resins; cellulose derivatives such as esters or ethers, e.g., cellulose acetate or butyrate, ethyl cellulose, or hydroxyethyl cellulose; sodium carboxymethyl cellulose; starch; a chlorine-containing organic polymer such as chlorinated rubber, rubber hydrochloride, polymers and copolymers of vinyl chloride or of vinylidene chloride, e.g., polyvinyl chloride, copolymers of vinyl chloride with vinyl acetate, polyvinylidene chloride, copolymers of vinylidene chloride with vinyl chloride or vinyl acetate, polychloroprene; epoxy resins; and other similar materials. The spumific agent may be dicyandiamide or melamine pyrophosphate, mono- or di-ammonium phosphate, phosphoric acid, guanyl urea phosphate, ammonium sulfate, sulfamic acid, ammonium sulfamate, ammonium bromide, sodium tungatate, boric acid, sodium borate, polyphosphorylamide, and water-insoluble metaphosphates such as those of sodium, potassium, calcium, or zinc. Melamine pyrophosphate, dicyandimide, and polyphosphorylamide are particularly preferred.

The volatile liquid vehicle or carrier may be water or an organic liquid such as a hydrocarbon, alcohol, ketone, ether, chlorinated hydrocarbon, etc. The precise identity of the liquid vehicle selected will depend upon its suitability for use with the particular binder, spumific agent, and other ingredients present. The vehicle preferably is inert chemically to the remaining ingredients.

Other optional ingredients which may be present in such intumescent paints include carbohydrates, such as starch, and similar materials which are not necessarily film-forming but which are carbonaceous and serve to enhance the effect of the spumific agent, such as a polyhydroxy alcohol, e.g., pentaerythritol, sorbitol, mannitol, dipentaerythritol, tripentaerythritol, and other similar saturated open-chain polyhydroxy alcohols containing from five to fifteen carbon atoms and from 4 to 8 hydroxyl groups. Plasticizers for the film-forming binder may also be present in order to increase the film-forming tendencies and to soften the resultant film.

Pigments, fillers, dyes, stabilizers and other conventional paint ingredients may also be present as desired, subject to the limitation that excessive quantities of pigments or fillers tend to cancel out the desirable effects of the glass fibers. Surface active agents or wetting agents may also be present, particularly when the vehicle is water, in order to promote dispersing of the remaining ingredients in the vehicle. Chlorinated organic materials which decompose to liberate hydrogen chloride when heated to temperatures of the order of 125° to 400°C or even higher may also be present, as for example chlorinated bi- or tri-phenyl or chlorinated paraffin waxes. Chlorine-containing binders, when present, may decompose in the same fashion. A non-film-forming aldehyde resin in finely divided particulate form, such as urea-formaldehyde or melamine-formaldehyde resins, which is insoluble in the vehicle and in the other ingredients present, may also be present.

The relative proportions of the ingredients present in addition to the inorganic fibrous material in the intumescent paint may vary over a wide range. Best results are generally obtained when the proportions in parts by weight are within the following ranges:

Film-forming material or binder - - - 35 to 150
Spumific - - - 120 to 475

Carbonaceous materials, whether or not they are film-forming, when present in addition to other film-forming materials, are preferably present in the range from 40 to 250 parts by weight while chlorinated material (non-film-forming) when present in addition to other film-forming materials is preferably in the range from 70 to 220 parts by weight. The amount of liquid vehicle or carrier may vary over a wide range depending upon the desired mode of application of the paint, the nature of the surface or substrate to which it is to be applied, and the nature and quantity of any optional ingredients which are present. The finely divided non-film-forming aldehyde resin, when present, may be used in the same range of proportions as the carbonaceous material.

The several ingredients are normally dissolved or dispersed in the volatile liquid vehicle or carrier, to provide a liquid paint or coating composition which is adapted to be spread or applied to the surface of the substrate to be protected in any conventional manner, as by brushing, roller applying, spraying, etc. The relative proportions of solid ingredients and liquid vehicle or carrier employed will be largely a matter of choice and will depend at least in part upon the mode of application of the composition to the substrate.

Protective composition including an intumescent paint and glass fibers are described in U.S. Pat. No. 3,284,216. The intumescent paint consists essentially of a volatile liquid vehicle, 35 to 150 parts by weight of a resinous film-forming binder, and 120 to 475 parts by weight of a solid spumific agent which when heated to 400°C causes dried film of the paint to increase in thickness at least 4 times. In the protective composition, there is mixed into the paint from 2 to 30% by weight (exclusive of organic coating on the fibers), based on the remaining paint ingredients, of glass fibers, generally from one-tenth inch to as much as 6 inches or more in length, those from ¼ to 1 inch in length being preferred as giving optimum results. The individual fibers may be dispersed in discrete form or as a randomly oriented mass throughout the mass of the composition, or yarns of about the same length composed of several individual fibers may be dispersed the composition.

For use in the present invention, the glass fibers may be provided by mineral wool (commercially available as e.g., "Blowing Wool", "Pouring Wool", "Thermafiber Spray Wool", "Spintex", "Banrock") containing glass fibers and, often, also "shot", or glass fragments. Where the protective composition is to be sprayed by a nozzle, to avoid clogging the shot should preferably be refined out of the glass wool.

Excellent results have been obtained with commercially available refined mineral wools such as the Superglas 1000 and Superglas 1500 having a fiber diameter of 3 to 5 microns; these fibers are readily wetted with aqueous solutions and do not absorb liquids. However, similar results may be obtained by refining or otherwise removing the shot from raw mineral wool. Glass fibers having larger diameters, up to 100 to 200 microns or even more, may also be used. Glass fibers precoated with a vinyl resin such as polyvinyl chloride or the like (Fiberglas screen yarn) in order to facilitate the dispersion of the fibers in the composition and to ensure that the composition may be readily sprayable in conventional spray equipment may also be used. The amount of vinyl resin coating on the fibers may range upwardly of 100% by weight of the inorganic portion. Usually, in compositions including coated fibers, at least about 1% of the total glass fiber weight thereof is coated fibers. Uncoated fiber glass may also be used although, where the protective composition is to be applied by spraying, the amount of uncoated fiber glass should not exceed about one-half percent by weight of the remaining paint ingredients.

The total glass fiber weight (not including the weight of any coating on the fibers) may range up to about 30% by weight of the remainder of the composition, including vehicle, without seriously impeding the spraying characteristics of the mix. Even higher proportions of fibers may be employed if specially designed spray equipment is available or if the composition is applied to the surface to be protected by some other method, as for example by trowelling. When the total glass fiber weight (exclusive of any fiber coating) amounts to less than about 2% of the weight of the remainder of the composition, it has little effect on the properties of the composition. Optimum effectiveness is obtained with compositions in which the bare glass fiber amounts to 8 to 25% by weight of the remainder of the composition, including solvents. Asbestos or ceramic fibers are not equivalent to glass fibers in the present invention and do not, by themselves, produce the improved results of the present invention. However, a limited quantity of asbestos or ceramic fibers, as well as of other inorganic fillers such as clay, may be present in addition to glass fibers; in some cases their presence may be desirable to provide for optimum spraying characteristics of the paint. As the amount of asbestos or ceramic fibers present is increased they have a deleterious effect which tends to cancel out the beneficial effect of the glass fibers. In general, the amount of conventional asbestos or ceramic fibers or of other inorganic fillers should not exceed about 80% by weight of the glass fibers present (exclusive of the weight of any coating on the fibers) for best results.

After drying by evaporation of the volatile solvents, the bare weight of the glass fibers amounts to about 16% to 50% by weight of the remainder of the protective composition (i.e., of the remaining solids content), preferably 30% to 40% by weight.

The fabric sheet employed may be itself either combustible or non-combustible. It may be lightweight, and, where woven, of a relatively open weave. Since the fabric sheet is most advantageously utilized at corners and other sharp edges, it should be flexible and conformable to such edges. Moreover, the fabric must be sufficiently permeable to receive a paint applied on either side, so as to unite with that paint, yet strong enough to become wetted with the paint without tearing, shredding, disintegrating or otherwise losing its fabric structure.

A preferred non-combustible material is a relatively open weave fiber glass cloth. However, combustible natural or synthetic fabrics may be used, including cotton cloth and certain oiled cloths (such as "WALL-TEX", a material including canvas and a number of baked-on oil coatings manufactured by Columbus Coated Fabrics Corp., Columbus, Ohio). Preferably, the fabric should have a small charring tendency, since charring weakens the fabric strength and hence weakens its reinforcing qualities. The strength of these fabrics (and hence also their resistance to shredding or tearing under elevated temperatures) may be further improved by applying a resinous coating to the fabric fibers.

Where a combustible fabric is employed, this fabric must be further coated with a fire-retardant and heat-resistant coating, such as an intumescent paint as described above, or a protective composition including an intumescent paint and glass fibers, some or all of which may be vinyl coated depending on the desired aesthetic appearance of the final surface coating. Preferably, however, even incombustible fabrics are thus coated, to provide a stronger, more uniform fire-retardant and heat-resistant coating. The fabric is united with either the underlying composition (if wet when fabric is applied) or with the overcoating by seepage of liquids from the protective composition or intumescent paint into the fabric, later drying of the composition or paint thus uniting the fabric therewith.

Where only corners or edges are to be covered, a sufficient overlap of fabric should be employed so that the expansion of the intumescent paint of the underlying protective composition layer, will not cause that layer to shed the fabric. Preferably, at least about a 6 inch wide sheet of fabric is used to cover a corner or edge, 3 inches overlapping on each side of the corner.

Where overall fabric protection is desired because of the extreme conditions of contemplated use for the underlying surface, or, for decorative purposes such as achieving a smooth, wall paper-like coating, the entire surface is covered, over the protective composition including an intumescent paint and glass fibers, with fabric, the underlying composition allowed to dry, and the fabric covered with an overcoating of an intumescent paint, which need not be combined with glass fibers and, for smooth coatings, is not so combined. However, fabric may be applied to either a wet or a dry protective composition (wet compositions, of course, aiding application), and the overcoating paint applied either before or after drying of the base protective composition.

For sufficiently lengthy protection of the surfaces against temperatures which may exceed 1800°F, at least about a 1/16 inch layer (dry thickness) of protective composition should be applied to the surface to be protected beneath the fabric; a dried layer of about three-eighths inch is an effective practical depth, affording maximum protection without employing an excess of the protective composition.

Other objects, features, and advantages of the present invention will appear from the following specific examples, which are not intended as a limitation on the scope of the invention.

EXAMPLE 1

A 10 inch steel I beam was prepared in accordance with the ASTM E-119-58 procedure, which tests the deflection of steel beams under an applied load. For the present example, a temperature of 1000°F was taken to be the temperature at which this steel beam would deflect. Thermocouples were attached to three locations in the steel beam sample to give an average temperature, and another thermocouple was inserted in a furnace (the furnace being also as prescribed by ASTM E-119-38).

This steel sample A was covered with about three-eighths inch of dried protective composition having the following ingredients in parts by weight:

|  | Parts |
| --- | --- |
| Chlorinated Rubber | 15 |
| Aromatic hydrocarbon solvent (Amsco D) | 85 |
| Dipentaerythritol (carbonaceous) | 9 |
| Melamine pyrophosphate (spumific) | 30 |
| Glass fibers (refined mineral wool) | 9 |

A second steel sample B was prepared, with identically attached thermocouples, and coated also with three-eighths inch of the above protective composition. However, this paint was overlayered with an open weave fiber glass cloth while wet and allowed to dry; a further overcoating of an intumescent paint having the following composition in parts by weight, was then applied:

|  | Parts |
| --- | --- |
| Chlorinated Rubber | 15 |
| Aromatic hydrocarbon solvent (Amsco D) | 85 |
| Dipentaerythritol (carbonaceous) | 9 |
| Melamine pyrophosphate (spumific) | 30 |

The steel samples were then heated and the temperatures recorded by the thermocouples at suitable intervals. The following results were obtained:

TABLE 1

| Time (Mins.) | Furnace Temperature °F | Temperature of Sample A °F | Temperature of Sample B (fiber glass cloth) °F |
| --- | --- | --- | --- |
| 5 | 1000 | 200 | 100 |
| 10 | 1300 | 420 | 160 |
| 15 | 1400 | 460 | 200 |
| 20 | 1460 | 510 | 250 |
| 25 | 1510 | 550 | 280 |

TABLE 1-Continued

| Time (Mins.) | Furnace Temperature °F | Temperature of Sample A °F | Temperature of Sample B (fiber glass cloth) °F |
|---|---|---|---|
| 30 | 1550 | 690 | 310 |
| 35 | 1580 | 860* | 340 |
| 40 | 1610 | over 1000 | 370 |
| 50 | 1660 | | 420 |
| 60 | 1700 | | 480 |
| 90 | 1800 | | 610 |
| 120 | 1860 | | 850 |
| 125 | 1850 | | 890 |
| 130 | 1870 | | 940 |
| 135 | 1870 | | 980 |

*Coating fell off the steel at this point.

Example 2

Two steel samples identical to those described in Example 1 were prepared. Sample C was coated with a ⅜ inch layer of a protective composition such as described in Example 1 except that instead of 9 parts glass fibers, there were used 4.5 parts glass fibers (refined mineral wool) and 4.5 parts of 0.1 to 1.0 inch long glass fibers precoated with polyvinyl chloride to assume a rod-like structure (Fiberglas screen yarn).

Sample D was coated with a ⅜ inch layer of the same protective composition and with open weave fiber glass cloth, and was overcoated with the intumescent paint described in Example 1. The samples were heated and temperatures measured at 5 minute intervals, as described in Example 1. The results are summarized below:

TABLE 2

| Time (Mins.) | Furnace Temperature °F | Temperature of Sample C °F | Temperature of Sample D (fiber glass cloth) °F |
|---|---|---|---|
| 5 | 1000 | 100 | 80 |
| 10 | 1300 | 160 | 150 |
| 15 | 1400 | 220 | 200 |
| 20 | 1460 | 280 | 240 |
| 25 | 1510 | 300 | 280 |
| 30 | 1550 | 350 | 310 |
| 40 | 1610 | 420 | 370 |
| 50 | 1660 | 510 | 420 |
| 60 | 1700 | 560 | 470 |
| 90 | 1800 | 820 | 610 |
| 95 | 1810 | 880 | 650 |
| 100 | 1820 | 950* | 680 |
| 120 | 1860 | | 850 |
| 125 | 1850 | | 900 |
| 130 | 1870 | | 950 |
| 135 | 1870 | | 1020 |

*At about 103 minutes, the steel reached 980°, and heating was ceased.

A comparison of Examples 1 and 2 shows that although protective compositions including an intumescent paint and uncoated glass fibers (refined mineral wool) make far poorer fire-retardant coatings than protective compositions containing some vinyl coated glass fibers (compare Sample A and Sample C), yet when identical layers of these two protective compositions were overlayered with fiber glass cloth and coated with an intumescent paint, the fire-retardant properties of the resultant multi-layered protective coatings were markedly similar (compare Sample B and Sample D).

Example 3

Three steel samples E, F, G, such as described in Example 1, were prepared and all were covered with a ⅜ inch layer of the protective composition described in Example 2. Samples F and G were also covered with a layer of fabric, and an overcoating of the intumescent paint described in Examples 1 and 2. The fabric was WALLTEX (a fabric wall covering consisting of canvas and a number of baked-on oil coatings, manufactured by Columbus Coated Fabrics Corp., Columbus, Ohio) in Sample F and woven cotton cloth in Sample G. The results are summarized below:

TABLE 3

| Time (Mins.) | Furnace Temp. °F | Temp. of Sample E °F | Temp. of Sample F ("WALLTEX") °F | Temp. of Sample G (cotton cloth) °F |
|---|---|---|---|---|
| 5 | 1000 | 100 | 80 | 130 |
| 10 | 1300 | 160 | 120 | 180 |
| 15 | 1400 | 220 | 170 | 240 |
| 20 | 1460 | 280 | 210 | 280 |
| 25 | 1510 | 300 | 240 | 310 |
| 30 | 1550 | 350 | 280 | 340 |
| 60 | 1700 | 560 | 460 | 520 |
| 90 | 1800 | 820 | 650 | 720 |
| 95 | 1810 | 880 | 700 | 760 |
| 100 | 1820 | 950* | 750 | 780 |
| 105 | 1840 | | 800 | 840 |
| 110 | 1840 | | 850 | 900 |
| 115 | 1840 | | 910 | 950 |
| 120 | 1860 | | 970 | 1020 |

*At about 103 minutes the steel reached 980°; and heating was stopped.

Other embodiments will occur to those skilled in the art and are within the following claims.

What is claimed is:

1. A process which comprises (A) coating the surface of a substrate having sharp edges with an intumescent paint consisting essentially of a volatile liquid vehicle, 35–150 parts by weight of a resinous film-forming binder, 120–475 parts by weight of a solid spumific, and 2–30% by weight of glass fibers, based on the weight of the other ingredients, (B) overlaying the paint with a flexible, permeable, conformable, incombustible textile fabric sheet so as to cover at least three inches on each side of each of the sharp edges, and (C) allowing the paint to dry to adhere the intumescent composition to the substrate and to the fabric.

2. The process of claim 1 wherein the intumescent paint is applied in the average dry thickness of at least about one-sixteenth inch.

3. The process of claim 1 wherein the exposed side of the fabric sheet is coated with a second intumescent paint consisting essentially of a volatile liquid vehicle, 35–150 parts by weight of a resinous film-forming binder, and 120–475 parts by weight of a solid spumific.

4. The process of claim 3 wherein the fabric sheet is woven-glass fiber cloth.

5. The process of claim 3 wherein at least some of the glass fibers are coated with polyvinyl chloride.

6. The process of claim 3 wherein the second intumescent paint also includes 2–30% by weight of glass fibers, based on the weight of the other ingredients.

* * * * *